United States Patent
Kieman et al.

(10) Patent No.: US 6,675,073 B2
(45) Date of Patent: Jan. 6, 2004

(54) SYSTEM AND METHOD FOR TUNING THE WEIGHT CONTROL OF A FLOW OF MATERIAL

(76) Inventors: Steve Kieman, 696 College Crest Rd., Westerville, OH (US) 43081; David Honigford, 6075 Borror Rd., Grove City, OH (US) 43123

( * ) Notice: Subject to any disclaimer, the term of this patent is extended or adjusted under 35 U.S.C. 154(b) by 75 days.

(21) Appl. No.: 09/996,317

(22) Filed: Nov. 20, 2001

(65) Prior Publication Data

US 2003/0097192 A1 May 22, 2003

(51) Int. Cl.[7] .................................................. G04F 5/00
(52) U.S. Cl. ........................ 700/305; 700/240; 700/37; 700/41; 700/42; 702/45; 702/50; 702/55; 702/173; 702/175
(58) Field of Search ................................ 700/32, 37–39, 700/41, 42, 44–46, 240, 282, 305; 702/45, 50, 55, 173–175; 73/861

(56) References Cited

U.S. PATENT DOCUMENTS

| | | | | |
|---|---|---|---|---|
| 4,045,657 A | * | 8/1977 | Falke | 700/122 |
| 4,544,280 A | * | 10/1985 | Mitsukawa | 366/141 |
| 4,581,704 A | * | 4/1986 | Mitsukawa | 700/239 |
| 4,867,343 A | * | 9/1989 | Ricciardi et al. | 222/1 |
| 5,132,897 A | * | 7/1992 | Allenberg | 700/29 |
| 5,184,754 A | * | 2/1993 | Hansen | 222/55 |
| 5,627,372 A | | 5/1997 | Sturm | 250/308 |
| 5,859,780 A | * | 1/1999 | Pearson | 700/240 |
| 6,061,608 A | * | 5/2000 | Moldavsky | 700/240 |
| 6,128,541 A | | 10/2000 | Junk | 700/39 |
| 6,343,617 B1 | * | 2/2002 | Tinsley et al. | 137/486 |
| 6,445,980 B1 | * | 9/2002 | Vyers | 700/282 |

* cited by examiner

Primary Examiner—Paul P. Gordon
Assistant Examiner—Crystal J Barnes
(74) Attorney, Agent, or Firm—Standley & Gilcrest

(57) ABSTRACT

The present invention includes a system and method for fine tuning the process of controlling the weight of a flow of material, such as a rod of material in a production facility. A control actuator in communication with a PID controller and PID control loop is used to change the unit volume of the flow so as to maintain a target unit weight. A measurement device captures unit weight measurements of the flow at intervals over the length of the flow. A change is introduced to a control actuator while the PID controller and PID control loop are disabled, and appropriate weight measurements of the flow are continually captured along with the control actuator's "feed back" position; a process that may be repeated several times. Once sufficient weight measurement data has been captured, the data is loaded into an optimization program that outputs optimized controlled parameters that may be used by the PID controller and control loop to better control the weight of the flow of material.

23 Claims, 2 Drawing Sheets

SYSTEM AND METHOD FOR TUNING THE WEIGHT CONTROL OF A FLOW OF MATERIAL

BACKGROUND AND SUMMARY OF THE INVENTION

The present invention relates generally to control tuning in a manufacturing process. Specifically, the invention relates to the optimization of a process control device when measuring and controlling the physical properties of articles moving through a manufacturing process.

Industrially manufactured products, such as, for example, tobacco cigarettes, extruded plastics, or steel billets, vary widely in physical makeup. The speed of movement of these materials as they are being processed may also vary widely. Some processes may move a work piece at a very slow rate of speed, while others move a work piece at speeds upwards of 40 mph.

However, in each of these manufacturing processes an ongoing need exists to measure and control the physical properties of the articles being made. Several devices have been designed and utilized to provide consistency in the physical properties of a line of manufactured articles. These devices may monitor such properties as length, weight, texture, and so forth. The results of this monitoring may be used to adjust parameters of the production process.

Differences between a target measurement for a given physical property of a manufactured article and its actual measurement can lead to excessive scrap, wasted machine time or lost orders, as the end product may be rejected by a demanding customer. Known systems have failed to provide for adequate control over the properties of such manufactured articles, due at least in part to their attempts to monitor and adjust the manufacturing process based on the short term and long term standard deviation of a measured property, for example, the weight deviation from a target weight. Therefore, a need exists for a system and method of ensuring that the finished properties of a manufactured article come as close as possible to corresponding target values.

The present invention satisfies this need. The system and method of the present invention examines long term standard deviation that occurs during the manufacturing process and makes adjustments accordingly. The present invention contemplates a system and method for measuring and controlling the weight of a flow of material. More specifically, the present invention provides a system and method for "fine tuning" a manufacturing process to more accurately produce a given article.

According to the system and method of the present invention, weight measurements of a flow are captured at synchronized intervals over the length of the flow, and proportional and integral calculations are thereafter performed on these weight measurements. A weight measurement device is preferably used to capture the desired unit weight measurements of the flow at proper intervals over the length thereof. A control actuator, in communication with a controller and control loop, is preferably used to change the unit volume of the flow so as to sufficiently maintain a target unit weight. Based on the results of the proportional and integral calculations, the flow may be adjusted to compensate for the duration of any deviation in the weight measurements from a target weight, and further deviations may be anticipated such that the total amount of deviation is reduced.

The system and method of the present invention preferably employs a proportional, integral, derivative (PID) algorithm and control loop to make the calculations and adjustments necessary to fine tune the device. In certain embodiments of the present invention, preferably only the proportional and integral portions of the PID algorithm are utilized, although the derivative portion may also be used if desired.

Essentially, the proportional portion of the control loop measures the error or deviation between a setpoint weight value and a measured weight value of the flow. Under proportional control, an attempt is made to adjust the output of a flow adjusting device connected to the control actuator so that any error between the setpoint weight value and a measured weight value of the flow is removed. This is accomplished by the amount of change that will occur in the output of the control actuator as a result of a change to a corresponding input thereof. With error and gain known, the bias of the PID controller may then be adjusted (or the controller "reset") in order to move the output of the control actuator as necessary to cause the weight of the flow to reach the setpoint value. The integral portion of the PID control loop is then used to continually and more accurately adjust the bias of the controller. Without the integral portion of the control loop, bias adjustments to the controller would have to be accomplished manually. To more accurately tune the device, the integral portion of the PID control loop may effect an automatic bias adjustment (automatic reset) whenever an error between the setpoint value and measured value are detected.

To accomplish fine tuning, small adjustments (bumps) are periodically and manually made to the input of the control actuator. In response to the input change, the output of the control actuator will cause movement of the flow adjusting device for a specified amount of time. Individual weight measurements are taken, preferably from a time before each bump to the input is initiated, through a time after the output has fully responded to the change in the input. Weight measurements are collected for each of the bumps, and the collected data is fed into an optimization program. Based on the collected data it receives, the optimization software can then generate tuned control parameters for use by the PID control loop. Therefore, by utilizing the tuned control parameters, the system and method of the present invention allows the mean weight of the material flow to be more quickly and more accurately adjusted and controlled than is possible with known systems and methods.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The present invention is directed to a system and method for fine tuning the weight control of a material flow useful in the production of, for example, rods of the material.

Known systems have attempted to tune applicable manufacturing devices by measuring the short term standard deviation of the weight of the material and making corresponding adjustments to a flow control device. The present system and method is concerned with calculating long term standard deviation, and calculating and implementing tuned parameters for use by a PID control loop that enables more accurate and timely weight adjustments to be accomplished.

Figure 1:
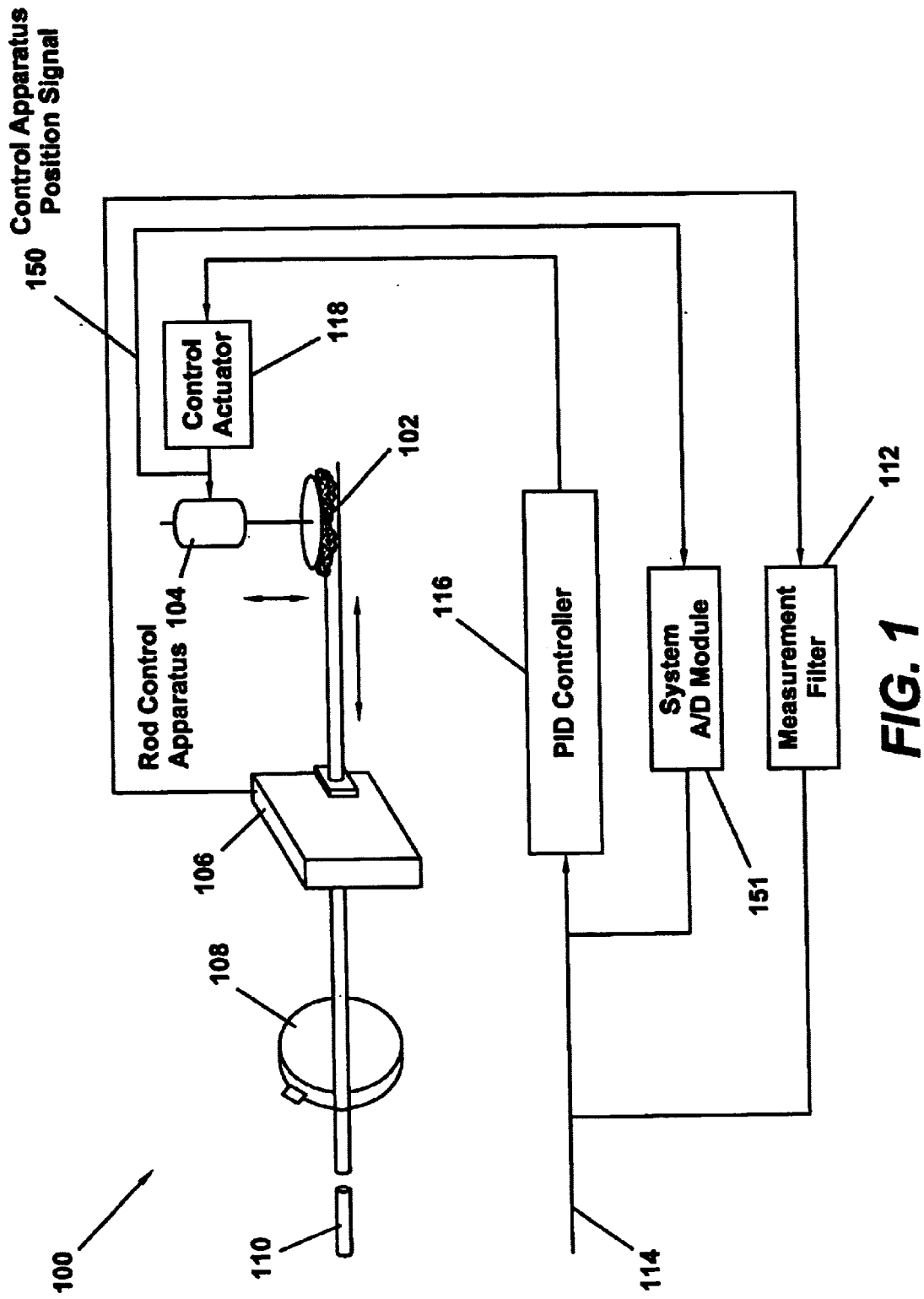
FIG. 1 is a diagram of one embodiment of an apparatus of the present invention.

An exemplary system 100 of the present invention is shown by the diagram of FIG. 1. In this system, a flow of material 102 is passed to a weight measurement sensor 106. The flow of material 102 is preferably in a form conducive to placement in a rod formation. The weight measurement sensor 106 may be any appropriate sensor for making precise measurements of rod weight over the length of the flow 102, but preferably utilizes beta, microwave, or x-ray technology for fast, highly accurate rod weight measurement. A preferred weight measurement sensor 106 may include, for example, a fast-response ionization chamber containing measurement stability-maintaining electronics adapted to alleviate the need for internal temperature compensation. When used for measuring the weight of tobacco cigarettes, for example, a preferred weight measurement sensor 106 measures the weight at or near at least 24 points along the length of each cigarette rod, but preferably may also measure the weight at more than 24 points. The weight measurements obtained by the measurement sensor 106 may be recorded at speeds exceeding, for example, 12,000 rods per minute. A true calibration curve is preferably used to determine weight, thereby eliminating errors inherent in conventional straight-line approximations. When the system of the present invention is used in the manufacture of tobacco cigarettes, the flow of material (tobacco) may be wrapped in paper and cut, such as by a knife cutter 108, into individual cigarettes 110.

Measurements taken from the measurement sensor or sensor unit 106 are sent to a proportional, integral, derivative (PID) control loop, which determines the corrections to be transmitted to the control actuator 118 that is adapted to adjust a rod control apparatus 104. The rod control apparatus 104 is preferably employed to alter the amount of material per unit length in order to compensate for changes in rod weight. For example, in one embodiment of the present invention adapted for use in the manufacture of tobacco cigarettes, the rod control apparatus includes a horizontally situated trimmer (not shown) that removes more tobacco from an underlying suction band when moved closer to the flow of tobacco, and allows more tobacco to remain on the underlying suction band when moved farther away from the flow of tobacco.

A PID control loop and PID controller 116 may be used in order to more accurately and efficiently control individual rod weight, and to automatically compensate for process dynamics and the time delay between control actions and system measurements. The PID control loop may preferably use a first measurement filter 112 to filter out any extraneous data sent by the measurement unit 106, such as glitches or extreme readings due to misplaced or miscut material. This filtered measurement data is then preferably compared to the target weight 114 and passed to the PID controller 116.

The PID controller 116 allows adjustment of the output signal sent to the control actuator 118 based on the duration of any measured error, not just the magnitude of that error as in previous systems. Consequently, as long as an error offset exists, the integral portion of the PID control loop may continue to cause the output of the actuator to adjust the rod control apparatus 104 in an attempt to reduce the error measurement to zero.

On many processes there is a control apparatus position signal 150 that is a "feed back" position signal into the system A/D module 151 and it is used to monitor whether the rod control apparatus 104 is on a limit.

Figure 2:
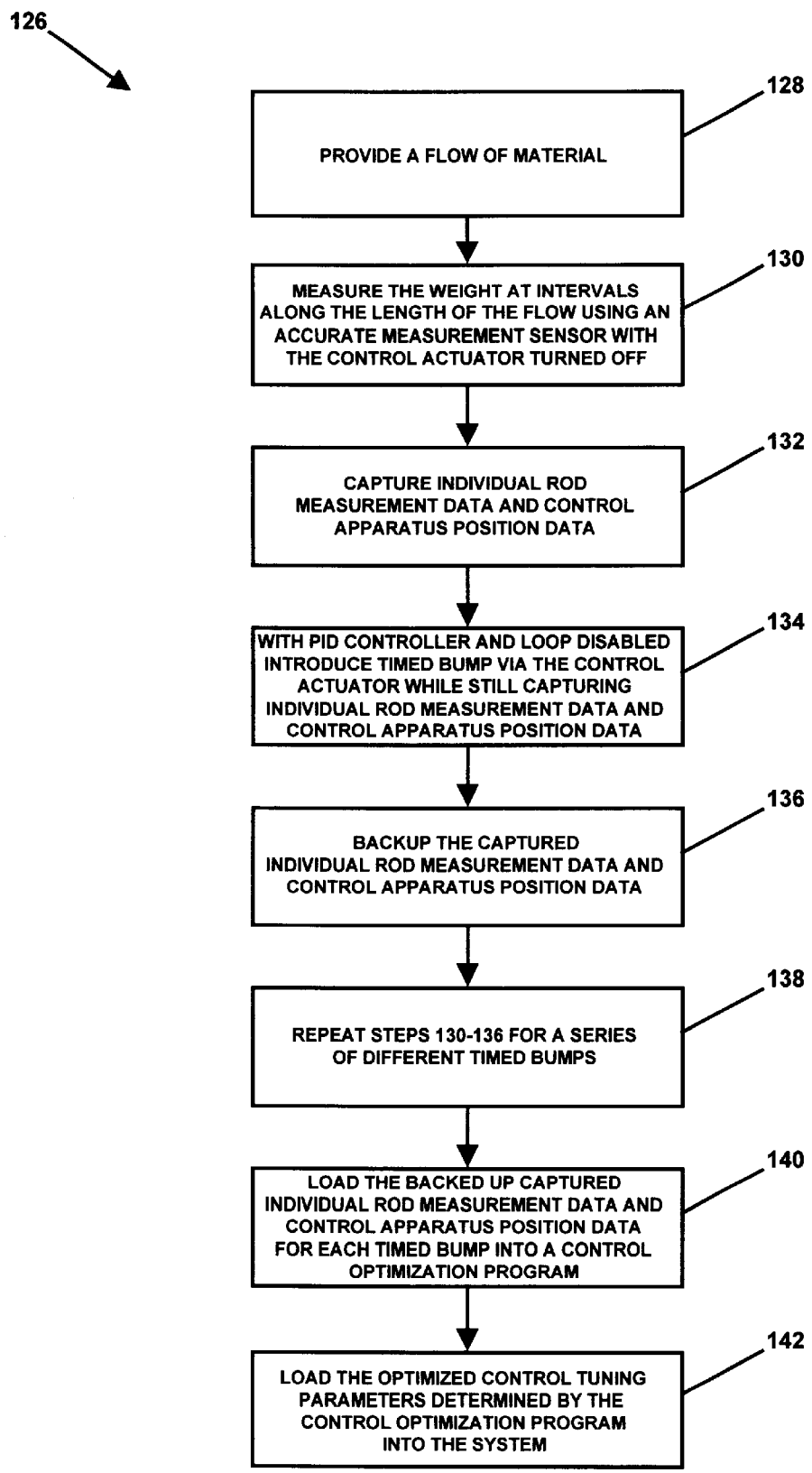
FIG. 2 is a flow chart showing the basic steps of a proportional, integral (PI) control tuning method in accordance with one embodiment of the present invention.

The steps of a first preferred method 126 of fine tuning a weight control system according to the present invention are shown generally in FIG. 2. In this method, a flow of material, such as a rod-like flow of material, is provided 128 through a manufacturing process. With the control actuator 118 turned off, and using a sufficiently accurate measurement sensor or other measurement device, the weight of the flow is measured 130 at multiple intervals along a predetermined length defining an individual rod. In this manner, the measurement data for each individual rod may then be captured 132 and stored.

After capturing individual rod measurement data 132 and "feed back" position data, and with the PID controller and PID control loop disabled, a timed bump, or step, is preferably introduced to the input of the controller 134 by briefly manually activating the control actuator 118, and subsequently the rod control apparatus 104. The rod control apparatus 104 will then move, as directed, toward or away from the flow of material 102 for the amount of time input to the control actuator 118. Movement of the rod control apparatus 104 will generally result in a change in the weight of the flow of material 102. An observable change in the weight of the flow of material 102 may lag somewhat behind the activation of the control actuator 118 and rod control apparatus 104, and the full effect of the bump will typically occur gradually as the rod control apparatus completes its movement. Thus, it is preferable that individual rod measurement data be continually captured and stored 136 for a predetermined period of time—preferably before, during and after initiation of the bump. In this manner, weight measurement data may be obtained prior to the change in the output caused by the bump and compared with weight measurement data collected after the change in the output is completed.

Preferably, steps 130–136 are repeated for a series of different timed bumps 138 that are initiated over a length of the flow. Each bump may be initiated, for example, to coincide with the passage of a particular number of individual rods that will produce data sufficient to analyze the weight change of the material flow. For example, when the method of the present invention is used in the production of tobacco cigarettes, a timed bump may be manually initiated within approximately a 5,000 cigarette interval.

A number of different timed bumps are preferably initiated, so that an adequate slope may be developed from the resulting data and charted. While various numbers of different timed bumps may prove sufficient, it has been found that a minimum of approximately 6 bumps is required to provide an accurate assessment of the response. Although more than 6 bumps may also be performed, the accomplishment of additional bumps also adds time to the fine tuning process. In the system of the present invention illustrated in FIG. 1, it is also preferable that the timed bumps be of both positive and negative value (3 of each, for example), meaning that the actuator will move some distance both further from, and nearer to, the flow. This method is preferably utilized in conjunction with the system of FIG. 1, because as the actuator moves both with and against the force of gravity, different amounts of energy must be applied to the actuator input to effect a similar change in actuator output.

The individual rod measurement data initially collected, and the individual rod measurement data collected during the series of preferably different timed bumps, is then preferably stored, properly compiled, and loaded into a control optimization program 140. Suitable control optimization software is commercially available, such as, for example, MATLAB software, and preferably runs on a PC or other suitable computing device. Based on the collected data it receives, the control optimization software generates tuned control parameters which may then be input into the control system 142 of the present invention. The tuned control parameters allow the PID controller and control loop to more quickly and accurately adjust and control the mean weight of the material flow and subsequently produced articles than would otherwise be possible.

From the foregoing, it can be seen that the system and method of the present invention allows for the weight of a flow of material used in a manufacturing process to be more quickly and accurately adjusted to conform to a predetermined setpoint. While certain embodiments of the present invention are described in detail above to allow one skilled in the art to practice the invention, the scope of the invention is not to be considered limited by such disclosure, and modifications are possible without departing from the spirit of the invention as evidenced by the following claims:

What is claimed is:

1. A system for measuring and controlling the weight of a flow of material, said device comprising:
    (a) At least one measurement device adapted to capture unit weight measurements of said flow at intervals over the length of said flow;
    (b) a control actuator adapted to change the unit volume of said flow in order to maintain a target unit weight of said flow;
    (c) at least one PID controller in communication with at least one PID control loop, said control loop utilizing at least a proportional portion and an integral portion thereof to detect deviations between setpoint weight values and measured weight values at points along said flow of material and to automatically adjust said control actuator in response thereto; and
    (d) optimization software for receiving compiled weight measurement data collected from a period prior to, and subsequently of, one or more changes to an input of said controller, said optimization software adapted to use said compiled weight measurement data to calculate optimized parameters for allowing said PID controller and said PID control loop to more quickly and accurately adjust said control actuator to eliminate said deviations.

2. A system according to claim 1, wherein said flow of material is a moving rod of material.

3. A system according to claim 1, wherein said flow of material comprises a flow of tobacco.

4. A system according to claim 1, additionally comprising at least one measurement filter adapted to filter said unit weight measurements.

5. A system according to claim 1, wherein said measurement device utilizes beta technology for accomplishing said unit weight measurements.

6. A system according to claim 1, wherein said measurement device utilizes microwave technology for said unit weight measurements.

7. A system according to claim 1, wherein said measurement device utilizes x-ray technology for accomplishing said unit weight measurements.

8. A system according to claim 1, wherein said PID controller is adapted to adjust the output signal sent to the control actuator based on the duration of any measured deviation, not just the magnitude of the deviation.

9. A system according to claim 1, further comprising a derivative control loop in communication with said PID controller and said control actuator, said derivative loop adapted to perform derivative calculations on said unit weight measurements such that said PID controller can adjust said control actuator in a manner that is proportional to the rate of change of said deviations, and whereby said deviations may further be anticipated and the total amount of said deviation reduced.

10. A system according to claim 1 wherein said measurement device comprises a fast-response ionization chamber.

11. A system according to claim 1 additionally comprising at least one user interface.

12. A system according to claim 11 wherein said user interface is adapted to allow tuning and configuration of said flow of material.

13. A method for fine tuning the control of the weight of a flow of material, said method comprising the steps of:
    (a) providing a flow of material that may be controlled by a PID controller in communication with a PID control loop;
    (b) taking weight measurements of said flow at predetermined intervals over the length of said flow;
    (c) storing said weight measurements in a manner such that a predetermined number of identifiable weight measurements may be associated with individual units of said flow;
    (d) initiating the timed movement of a device adapted to adjust the weight of said flow, said movement causing a change in the weight of said flow and a corresponding change to an input of the PID controller adapted to receive said weight measurements;
    (e) taking and storing weight measurements and control apparatus "feed back" position of said flow according to steps (b)–(c) from at least the time coinciding with initiation of said timed movement, to at least the time coinciding with the completion of the change in the weight of said flow;
    (f) repeating steps (d)–(e) a desired number of times at predetermined intervals;
    (g) compiling all of said stored weight measurement data and loading said compiled weight measurement data into an optimization program adapted to output optimized control parameters; and
    (h) loading said optimized control parameters into said PID controller such that said flow of material may be adjusted according thereto using said control loop.

14. The method of claim 13, additionally comprising the step of filtering said weight measurements.

15. The method of claim 13, wherein said flow of material is a moving rod of material.

16. The method of claim 13, wherein said flow of material comprises a flow of tobacco.

17. The method of claim 13, wherein said capturing of weight measurements is accomplished utilizing beta technology.

18. The method of claim 13, wherein said capturing of weight measurements is accomplished utilizing microwave technology.

19. The method of claim 13, wherein said capturing of weight measurements is accomplished utilizing x-ray technology.

20. The method of claim 13, wherein said capturing of weight measurements is accomplished using a fast-response ionization chamber.

21. The method of claim 13, wherein only a proportional and integral portion of said PID controller and control loop is used to control the weight of said flow of material.

22. The method of claim 13, further comprising the use of a derivative portion of said PID controller and control loop to control the weight of said flow of material.

23. The method of claim 13, wherein said weight measurements are taken and stored from a time prior to initiation of said timed movement, to a time subsequent to the completion of the change in the weight of said flow caused by said timed movement.

* * * * *